US007507295B2

(12) United States Patent
Ganzer et al.

(10) Patent No.: US 7,507,295 B2
(45) Date of Patent: Mar. 24, 2009

(54) ADHESIVE DISPENSER

(75) Inventors: Charles P. Ganzer, Cumming, GA (US); Scott D. Walker, Roswell, GA (US)

(73) Assignee: Nordson Corporation, Westlake, OH (US)

( * ) Notice: Subject to any disclaimer, the term of this patent is extended or adjusted under 35 U.S.C. 154(b) by 324 days.

(21) Appl. No.: 11/263,485

(22) Filed: Oct. 31, 2005

(65) Prior Publication Data

US 2006/0213434 A1 Sep. 28, 2006

Related U.S. Application Data

(60) Provisional application No. 60/664,136, filed on Mar. 22, 2005.

(51) Int. Cl.
*B05B 7/06* (2006.01)
*B05B 1/14* (2006.01)
*G01F 11/00* (2006.01)

(52) U.S. Cl. ....................... 118/313; 118/314; 118/315; 118/300; 239/550

(58) Field of Classification Search ................. 118/300, 118/313, 410, 411, 314, 315, 307; 239/128, 239/133, 134, 135, 550, 551, 267, 268; 137/338, 137/884; 222/630, 146.1, 368, 330
See application file for complete search history.

(56) References Cited

U.S. PATENT DOCUMENTS

| | | | |
|---|---|---|---|
| 490,146 | A | 1/1893 | James |
| 2,641,871 | A | 6/1953 | Ray |
| 2,796,847 | A | 6/1957 | Guggenheim |
| 2,993,488 | A | 7/1961 | Stec |
| 3,170,483 | A | 2/1965 | Milroy |
| 3,312,241 | A | 4/1967 | Bryant |
| 3,459,336 | A | 8/1969 | Ruud |
| 4,550,681 | A | 11/1985 | Zimmer et al. |
| 4,565,217 | A | 1/1986 | McIntyre |
| 4,922,852 | A | 5/1990 | Price |

(Continued)

FOREIGN PATENT DOCUMENTS

| | | | |
|---|---|---|---|
| DE | 447219 | A | 5/1936 |

(Continued)

OTHER PUBLICATIONS

European Patent Office, International Search Report and Written Opinion in Corresponding PCT Application Serial No. PCT/US2006-005619, Aug. 7, 2006.

*Primary Examiner*—Yewebdar T Tadesse
(74) *Attorney, Agent, or Firm*—Wood, Herron & Evans, L.L.P.

(57) ABSTRACT

An adhesive dispenser is provided that includes a valve body, a valve block mounted for sliding movement along a surface of the valve body and an actuator assembly operative to move the valve block between open and closed positions. With the valve block in an open position, adhesive can flow through a supply passage, a first plurality of distribution passages in the valve body, and a second plurality of distribution passages in the valve block. The second plurality of distribution passages have first ends that open toward the valve body and second ends adapted to the dispense adhesive onto a substrate. When the valve block is in the closed position, the first and second pluralities of distribution passages are misaligned and adhesive is not dispensed.

16 Claims, 11 Drawing Sheets

U.S. PATENT DOCUMENTS

| | | | |
|---|---|---|---|
| 5,129,772 | A | 7/1992 | Slautterback |
| 5,271,794 | A | 12/1993 | Jarrell et al. |
| 5,370,319 | A | 12/1994 | Schlegel |
| 6,422,428 | B1 * | 7/2002 | Allen et al. ................. 222/318 |
| 6,689,214 | B2 | 2/2004 | Burmester et al. |
| 6,695,031 | B1 | 2/2004 | Baltensperger |
| 6,802,904 | B2 | 10/2004 | Pedigrew |

FOREIGN PATENT DOCUMENTS

| | | | |
|---|---|---|---|
| DE | 7704627 | U1 | 7/1977 |
| DE | 3234963 | A1 | 3/1984 |
| DE | 20303182 | U1 | 7/2003 |
| EP | 0453936 | | 10/1991 |
| GB | 1503511 | A | 3/1978 |

* cited by examiner

ADHESIVE DISPENSER

CROSS-REFERENCES

The application claims the priority benefit of U.S. Provisional Patent Application No. 60/664,136 filed on Mar. 22, 2005, which is expressly incorporated by reference herein in its entirety.

FIELD OF THE INVENTION

The present invention generally relates to adhesive dispensers and, more particularly, to a dispenser for application of a two-dimensional pattern of free-flowing adhesive to a work piece which is in motion relative to the dispenser. The dispenser of the present invention can be used in various applications including furniture edge banding.

BACKGROUND

Most systems used in the furniture industry today to apply adhesive two-dimensionally to furniture parts, including the edge of a panel, utilize an open glue pot and roller to apply adhesive via direct contact between the roller and the panel moving past the roller. A doctor blade is typically used to control the amount of adhesive on the roller. Open systems of this type require relatively high maintenance, especially when used with polyurethane reactive adhesives since these adhesives react with moisture in the air. This causes the adhesive to cure partially and typically requires cleaning the open glue pot at the end of each shift of production.

In order to resolve problems associated with open glue pot systems, the industry has utilized “closed” systems employing a “hot melt unit” to melt the adhesive material and pump it through a heated hose at high pressure to a gun or dispensing head. The dispensing head is typically mounted on a frame, and the panel material is conveyed past the applicator head by a transport device. During operation, the adhesive is discharged through an elongated slot of a slot nozzle assembly and is dispensed onto the surface of the substrate being conveyed past the slot. The slot is usually oriented transverse to the direction of the relative motion between the dispensing head and the substrate.

Dispensing heads of the foregoing type have been successfully used in many applications, but they can exhibit certain disadvantages. For instance, it can be difficult to control the application of the hot melt material discharging from the slot, with those slots that are relatively wide. In these instances, thick layers of glue tend to go over edges of the work piece, creating cleaning issues downstream.

Another problem with the slot dispenser heads is that there is a reservoir of material remaining between the valving point and the slot after the dispenser is turned off. This volume of adhesive oozes out of the slot and can prevent the slot dispenser from finishing with a clean edge. The additional adhesive can form strings from the end of the work piece, which adds cleaning steps and potentially additional maintenance of the machinery. One approach to resolving this problem has been the use of a secondary valve and a shaft that is inserted into the. reservoir when the adhesive is dispensing and then retracted when the dispenser is turned off. The retraction of the shaft from the reservoir creates a vacuum or lower pressure, which sucks the adhesive back to provide a clean cut off of the adhesive. However, this “suck back” system adds complexity and cost to the dispenser.

Also, the use of slot type dispensing heads and glue pot roller systems can result in problems with applying adhesive to certain grades of particle board. Particle boards contain dense materials on the outside of the panel and less dense material on the inside of the panel. The lower density areas of the particle boards are more absorbent and can absorb the glue before the edge band is applied.

SUMMARY

In view of the foregoing, an adhesive dispenser is provided that includes a valve body having an adhesive supply passage, a valve block mounted for sliding movement along a surface of the valve body, and an actuator assembly operative to move the valve block between open and closed positions. A first plurality of distribution passages are formed in the valve body and at least some of these passages communicate with the supply passage at first ends thereof. Each of the first plurality of distribution passages open onto a first surface of the valve body at second ends thereof. The valve block includes a second plurality of distribution passages having first ends opening toward the valve body and second ends adapted to dispense adhesive onto the substrate. When the valve block is in an open position, the first ends of the second plurality of distribution passages are aligned with, and are in fluid communication with, the second ends of the first plurality of distribution passages. When the valve block is in a closed position, the first ends of the second plurality of distributions passages are not aligned with, and are not in fluid communication with, the second ends of the first plurality of distribution passages.

In various embodiments, the adhesive dispenser of the present invention can include one or more of the subsequently discussed features. Both the valve block and valve body can include outer surfaces with grooves extending substantially in a direction corresponding to a direction of movement of the substrate. The grooves of the valve body are aligned with the grooves of the valve block when the valve block is in an open position and are misaligned with one another when the valve block is in a closed position. Both sets of grooves can have substantially V-shaped cross-sections.

The dispenser can also include a graduated cylinder secured to the valve body, with the cylinder including an internal bore that is substantially aligned with at least a portion of the supply passage. The cylinder can include a plurality of longitudinally spaced grooves formed in an outer surface that are operatively effective for providing an indication of the width of the pattern of the adhesive being dispensed. The cylinder can further include a plurality of indicia on the outer surface, with each of the indicia being aligned with one of the grooves. The cylinder can further include an annular flange captured within a recess formed in the valve body.

The dispenser can further include a dosing rod that extends through the internal bore of the graduated cylinder and is disposed at least partially within the adhesive supply passage. The dosing rod is translatable within the supply passage and the number of the first plurality of distribution passages that communicate with the supply passage is determined by the position of the dosing rod within the passage. The dosing rod is translatable by rotating a handle secured to the dosing rod with the handle being threaded onto the graduated cylinder.

The actuator assembly includes at least one actuator and at least one connecting member coupled to the actuator. In one embodiment, two actuators and two connecting members are provided. The actuator assembly can further comprise a body, with each of the actuators disposed within the body.

Each actuator comprises at least one piston and a stem, and in one embodiment comprises two pistons, with the stem being coupled to each of the pistons. Each connecting member is coupled at one end thereof to the stem of the corresponding actuator and is coupled at the other end thereof to the valve block. The body of the actuator assembly is secured to the valve block.

Each of the actuators can be pneumatically actuated and, in this case, the assembly further comprises a valve having an air inlet port effective for receiving pressurized air from a source of pressurized air. The valve is operatively effective for simultaneously supplying air to a first side of each piston of each of the actuators, while venting an opposite side of each of the pistons of each actuator. Each actuator can further include a stationary piston separator assembly disposed intermediate the two pistons and disposed in sealing engagement with an internal surface of the body of the actuator assembly. In one embodiment, the valve can be an electrically operated solenoid valve.

The dispenser can include a plurality of mounting elements, comprising bolts and nuts, disposed in bores formed in the valve, so that the valve block is mounted for sliding movement along a surface of the valve body. The nuts can include a substantially hemispherically-shaped head, disposed in a counterbore, with the nut heads and counterbores cooperating to allow the bolts to pivot as the valve block slides relative to the valve body. The mounting elements can further include a plurality of biasing elements, that can be coil springs, that exert a force biasing the valve body into engagement with the valve block, while permitting the valve block to slide relative to the valve body. Each of the bolts passes through one of the coil springs.

A plurality of rollers can be rotatably mounted on the valve body of the dispenser, with the rollers being operatively effective for guiding the substrate as it moves relative to the dispenser. A heating element can be disposed within a receptacle formed in the valve body, with the heating element being operative effective for heating the valve body and the adhesive as it passes through the body. Additionally, a temperature-sensing device can be disposed within the valve body, with the device being operatively effective for sensing a temperature of the valve body.

According to a second aspect of the present invention, a method is provided for dispensing adhesive onto a substrate comprising the steps of supplying the adhesive to an inlet port of a first structure, and flowing the adhesive through the first structure to an exterior surface of the first structure via a network of passages including a first plurality of distribution passages. The method further includes the step of mounting a second structure to the first structure for sliding engagement with the first structure along the exterior surface of the first structure. The method also includes the step of actuating the second structure to an open position, wherein a second plurality of distribution passages formed in the second structure are substantially aligned with the first plurality of passages in the first structure and the adhesive flows through the second plurality of distribution passages onto the substrate.

BRIEF DESCRIPTION OF THE DRAWINGS

These and other features, aspects and advantages of the present invention will become better understood with regard to the following description, appended claims and accompanying drawings wherein:

DETAILED DESCRIPTION

Figure 1:
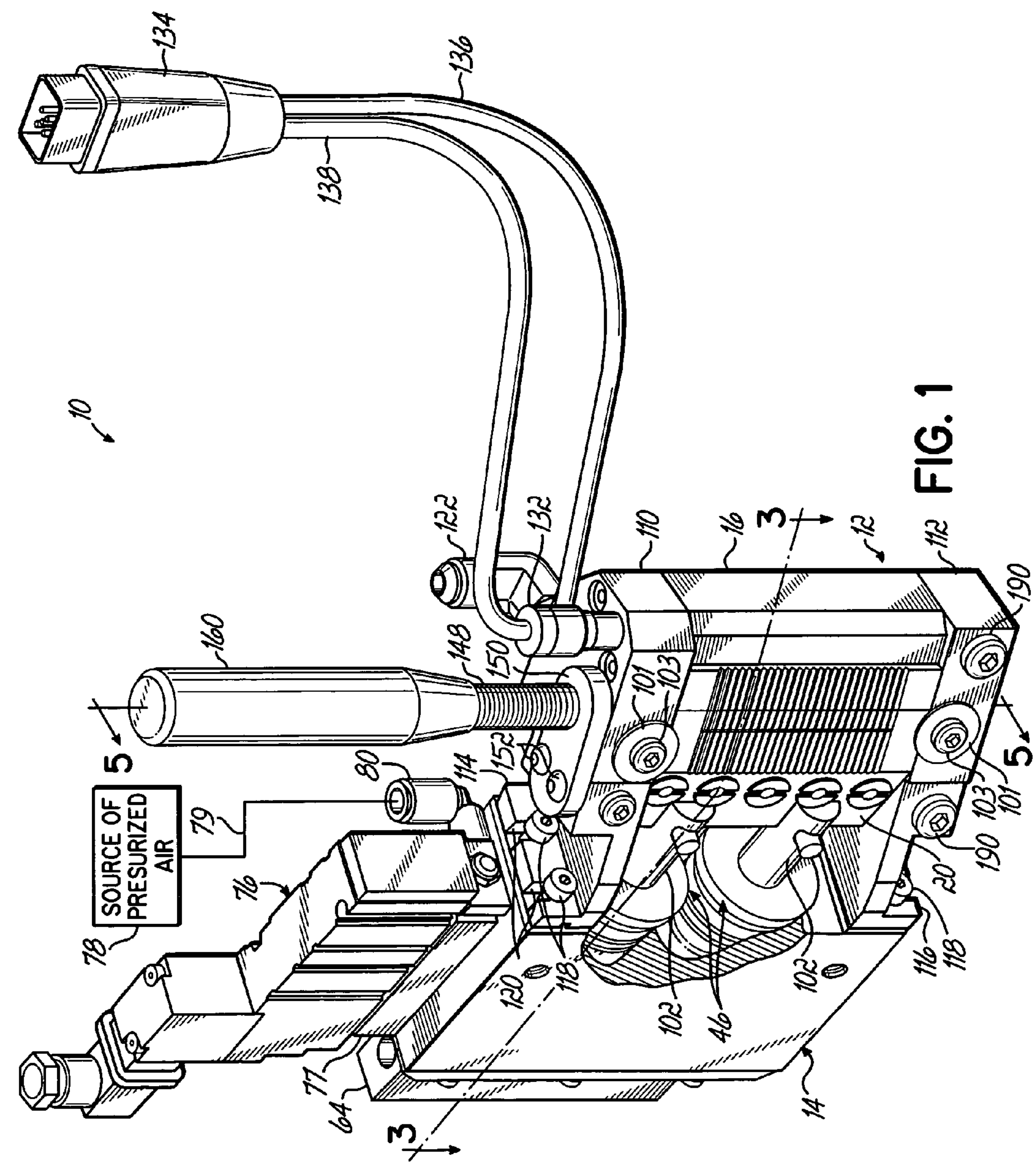
FIG. 1 is an isometric view of an adhesive dispenser according to first embodiment of the present invention.
Figure 2:
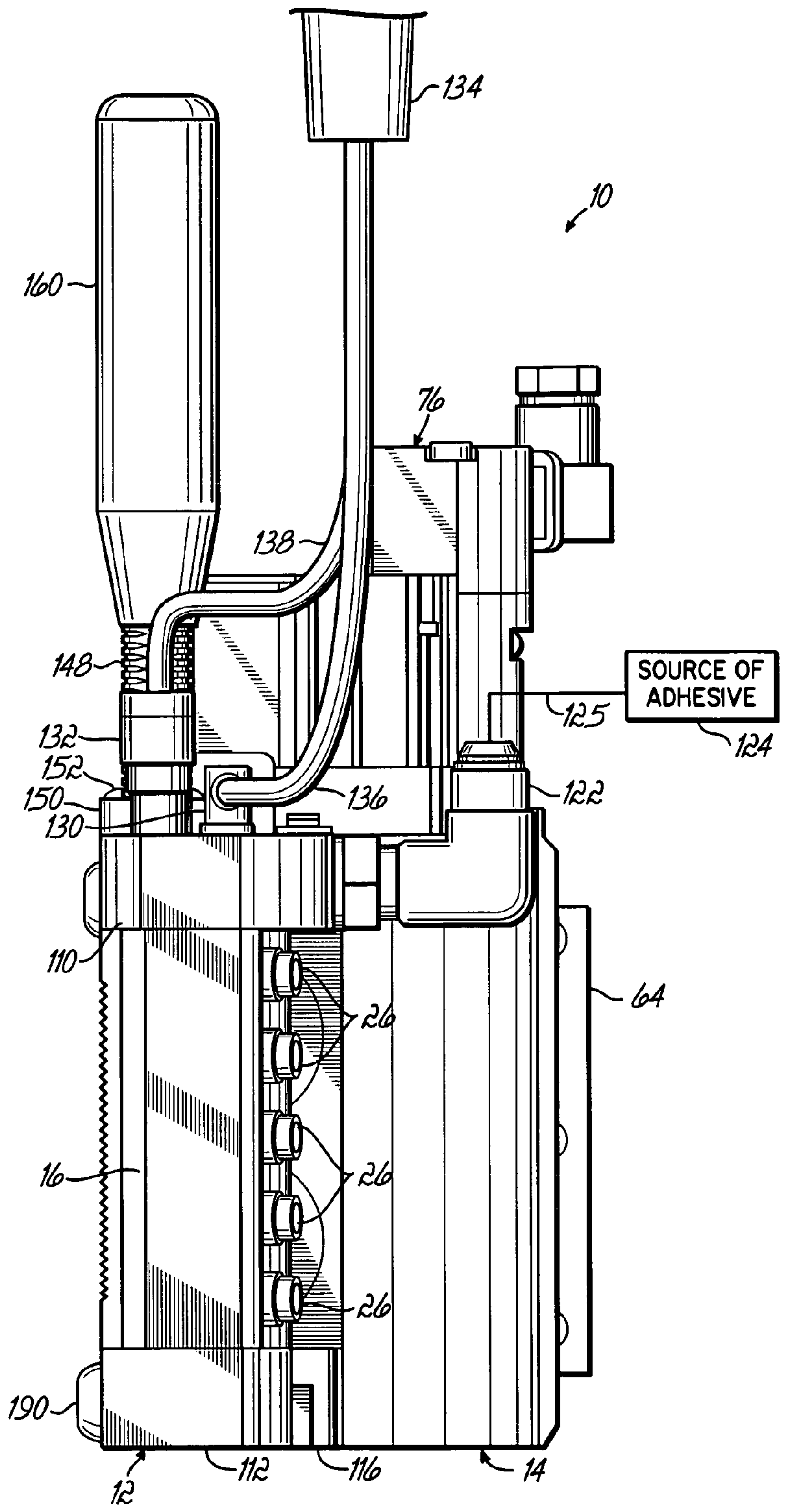
FIG. 2 is a side elevation view of the adhesive dispenser shown in FIG. 1.

Referring now to the drawings, FIG. 1 is an isometric view illustrating an adhesive dispenser 10 according to the present invention. Dispenser 10 can be adjusted to dispense adhesive patterns of varying width as subsequently discussed. Dispenser 10 includes a valve 12 and an actuator assembly 14 which are connected to one another as subsequently discussed. The valve 12 includes a valve body 16 having a first surface 18, shown in FIGS. 4 and 5, and a valve block 20 that is mounted for sliding movement along surface 18 of valve body 16. A plurality of bores 22 are formed in valve body 16, with individual ones of the bores 22 being spaced apart from one another. The valve body 16 also includes a plurality of bores 23 formed therein. The bores 23 have a relatively smaller diameter than bores 22, with each bore 23 extending through surface 18 at one end and communicating with bores 22 at the opposite end. A plurality of bores 24 are formed in valve block 20, with individual ones of the bores 24 being spaced apart from one another. Each of the bores 24 is generally aligned with one of the bores 22 to accommodate mounting elements as subsequently discussed. There are a like number of bores 22, 23 and 24, and, in the illustrative embodiment, there are five each of bores 22, 23 and 24. However, it should be understood that other numbers of bores 22, 23 and 24, as well as the corresponding mounting elements, can be used to mount valve block 20 to valve body 16.

The mounting elements that are used to mount valve block 20 to valve body 16, while permitting sliding movement of valve block 20 relative to valve body 16, include a plurality of fasteners, such as bolts 26 and nuts 28. Nuts 28 include a substantially hemispherically-shaped head 30 and a shank portion 32 having internal threads. A plurality of counterbores 34 are formed in valve block 20 and each of the counterbores 34 are aligned with and communicate with one of the bores 24 formed in valve block 20. The head 30 of each nut 28 is disposed within one of the counterbores 34 and the heads 30 of nuts 28 cooperate with the counterbores 34 to allow the bolts 26 to pivot within bores 22, 23 and 24 as the valve block 20 slides between an open position shown in FIG. 4A, and a closed position shown in FIG. 4B.

The mounting elements further include a plurality of biasing elements 36, with each of the biasing elements 36 being disposed in one of the bores 22 formed in valve body 16. In the illustrative embodiment, the biasing elements 36 comprise coil springs. Each coil spring 36 is disposed between a head 38 of one of the bolts 26 and a shoulder 40 formed in valve body 16 at the interface of bores 22 and 23. As bolts 26 are threaded into nuts 28, each spring 36 is compressed and exerts a force on the corresponding shoulder 40. The combined force exerted by springs 36 biases valve body 16 against valve block 20 along surface 18 of valve body 16 and a mating surface 42 of valve block 20. The magnitude of the force exerted by the springs 36 against shoulder 40 of valve body 16 is sufficient to force valve body 16 into contacting engagement with valve block 20 but small enough to permit valve block 20 to slide relative to valve body 16 when actuated.

Figure 4A:
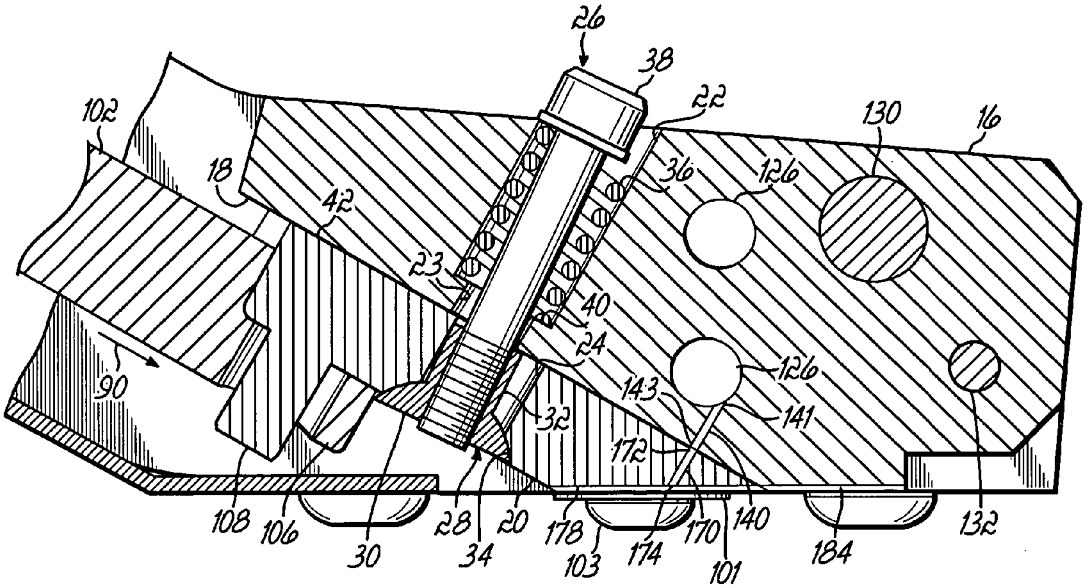
FIG. 4A is an enlarged, fragmentary view of the adhesive dispenser shown in FIG. 3, with an included valve block in an open position.
Figure 4B:
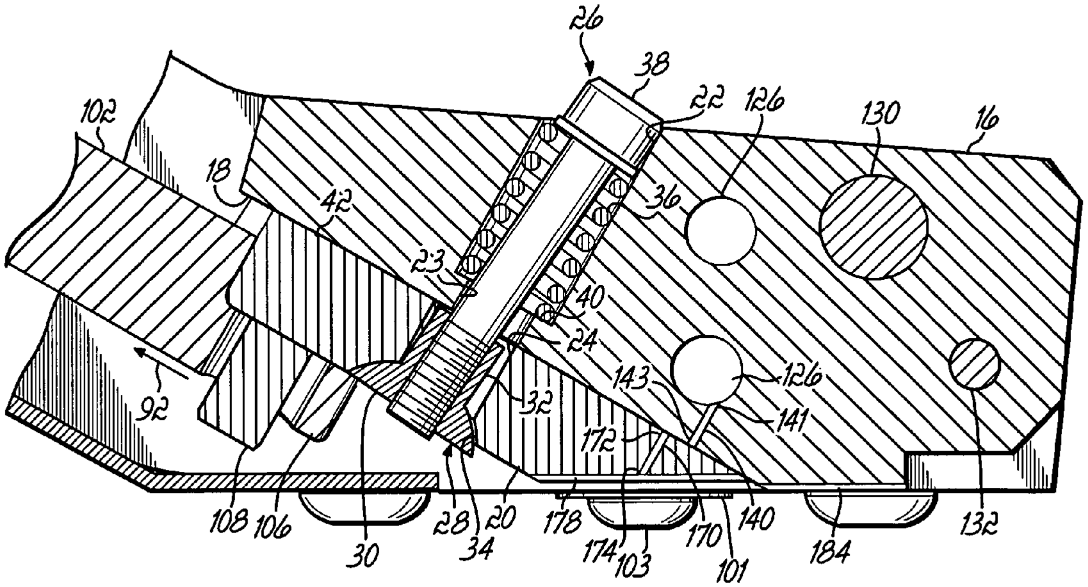
FIG. 4B is an enlarged, fragmentary view similar to FIG. 4A, but with the valve block in a closed position.

Valve body 16 and valve block 20 can be made of hardened tool steel and can be manufactured such that surface 18 of valve body 16 and the mating surface 42 of valve block 20 each has a flatness of about three lightbands (0.000030 inches) or less to provide a hydraulic seal between surfaces 18 and 42 when valve block 20 is in the closed position shown in FIG. 4B. Valve body 16 and valve block 20 can be of other materials and surfaces 18 and 42 can have different flatness values provided valve block 20 can slide relative to valve body 16 and a hydraulic seal is provided between surfaces 18 and 42 when valve block 20 is in the closed position shown in FIG. 4B to prevent adhesive from leaking between surfaces 18 and 42 when valve block 20 is in the closed position.

Figure 3:
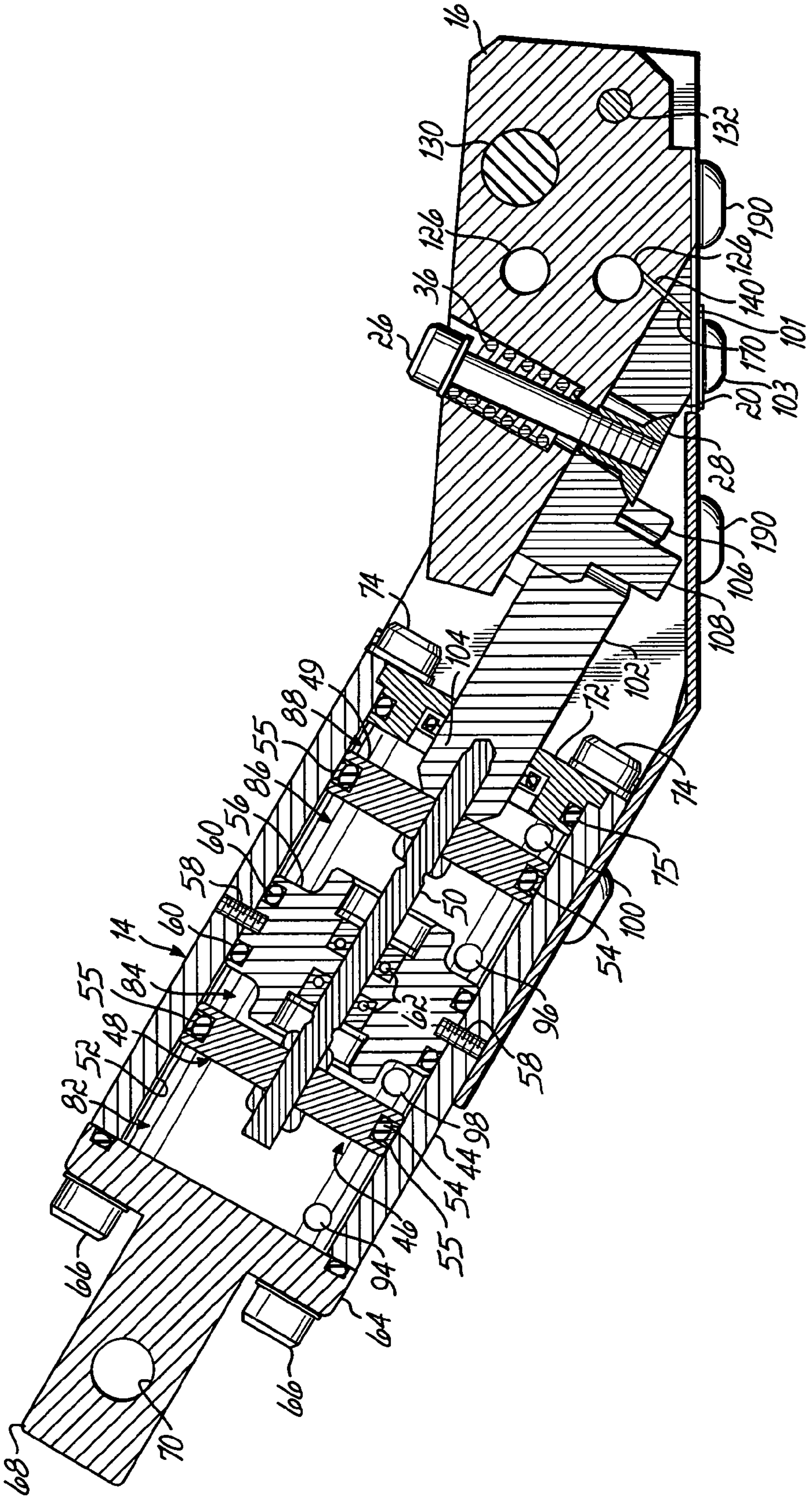
FIG. 3 is a cross-sectional view taken along line 3-3 in FIG. 1.

Referring now to the cross-sectional view shown in FIG. 3, the actuator assembly 14 includes a body 44 and a pair of actuators 46 disposed within body 44, with one of the actuators being shown in detail in FIG. 3. The body 44 of actuator assembly 14 can be constructed of an aluminum block with individual, substantially cylindrical bores formed therein to accommodate the actuators 46. However, other suitable constructions of body 44 can be utilized within the scope of the present invention. In the illustrative embodiment, each actuator 46 includes two pistons 48,49 that are secured by conventional means, to a stem 50 that extends longitudinally within body 44 and is translatable within body 44. Pistons 48 and 49 are in slidable sealing engagement with an inner surface 52 of body 44 via resilient sealing members, such as O-rings 54, and piston glide rings 55. In the illustrative embodiment, two pistons 48,49 are utilized to provide increased actuating force within the same space, as compared to an actuator having one piston. However, actuators having other numbers of pistons may be utilized within the scope of the invention. Additionally, other actuating devices may be used provided a sufficient actuating force is provided to slide valve block 20 relative to valve body 16 between the open and closed positions.

Each actuator 46 further includes a stationary sealing plug 56 disposed within the body 44 of actuator assembly 14. Each plug 56 is retained within body 44 by a plurality of set screws 58 and is disposed in sealing engagement with the inner surface 52 of actuator body 44 via resilient sealing members 60 that can be O-rings. Seals 62 provide a seal between stem 50 and sealing plug 56.

The actuator assembly 14 further includes an end block 64 that is attached to body 44 by a plurality of fasteners, such as bolts 66. End block 64 includes a protruding portion 68 having a hole 70 formed therein which can be utilized to accept a fastener for mounting the actuator assembly 14 to a support structure. A second end block 72 is secured to body 44 by a plurality of fasteners such as bolts 74. End block 72 is sealed against the inner surface 52 of body 44 by a resilient member such as O-ring 75.

In other embodiments the end block 64 can be replaced by an end block having a different configuration, including one having a generally L-shaped configuration, to accommodate mounting the adhesive dispenser 10 to a machine, such as an edge banding machine, that utilizes the adhesive dispenser 10.

The actuator assembly 14 further includes a valve 76 that receives pressurized air from a source 78 of pressurized air. The pressurized air is supplied from source 78 via a conduit 79 to an inlet port 80 of valve 76. In the embodiment shown in FIGS. 1-9, valve 76 is an electrically operated, four-way solenoid valve and is mounted in close proximity to the actuator body 44. More particularly, valve 76 is mounted on a manifolding block 77 disposed on the top of actuator body 44. However, in other embodiments, valve 76 may be spaced apart from manifolding block 77 for spatial consideration. In such a configuration, air supply tubes may extend between valve 76 and block 77 to provide air for the actuation of actuators 46.

Each of the actuators 46 includes cavities 82,84,86 and 88. As shown in FIG. 3, cavity 82 is disposed between end block 64 of actuator assembly 14 and a first side of piston 48 of actuator 46, while cavity 84 is disposed between an opposite side of piston 48 and sealing plug 56. Cavity 86 is disposed between sealing plug 56 and a first side of piston 49, while cavity 88 is disposed between an opposite side of piston 49 and end block 72. The pressurized air is routed through valve 76 to cavities 82,84,86 and 88 to actuate each actuator 46 between extended and retracted positions corresponding to the open and closed positions of valve block 20 shown in FIGS. 4A and 4B, respectively. When it is desired to actuate each actuator 46 in a first direction illustrated by arrow 90 in FIG. 4A, valve 76 is turned on and pressurized air is supplied through valve 76 and passages 94 and 96 to cavities 82 and 86, respectively. Simultaneously, cavities 84 and 88 are vented to atmosphere via passages 98 and 100, respectively, and valve 76. This causes each actuator 46 to move to an extended position, corresponding to the open position of valve block 20 illustrated in FIG. 4A. A pair of stops 101 are attached to valve 12 by conventional means such as bolts 103. Stops 101 are used to limit the travel of valve block 20 in direction 90 and are positioned so valve block 20 contacts stops 101 before actuators 46 are fully extended to set the travel of valve block 20. In the illustrative embodiment, stops 101 are washers, but other structures can be used as stops for valve block 20. As a further alternative, stops 101 can be eliminated, with the travel of actuators 46 determined by structure within actuators 46 as subsequently discussed in conjunction with the embodiment of the present invention illustrated in FIGS. 10 and 11.

When an operator desires to retract the actuators 46, which operate in parallel with one another, the solenoid valve 76 is turned off, or de-energized. With the solenoid valve 76 in this state, pressurized air is supplied to cavities 84 and 88 via passages 98 and 100, respectively, and cavities 82 and 86 are simultaneously vented to atmosphere via passages 94 and 96, respectively, and valve 76. This causes forces to be exerted on pistons 48 and 49 in a direction substantially parallel to the direction illustrated by arrow 92. As a result, pistons 48 and 49 and stem 50 translate within body 44 in a direction illustrated by arrow 92 to a retracted position corresponding to the closed position of valve block 20 shown in FIG. 4B.

Referring now to FIGS. 3, 4A and 4B, actuator assembly 14 further includes a pair of connecting members 102, with each of the connecting members 102 being associated with one of the actuators 46. As shown in FIG. 3, each connecting member 102 is coupled at a first end 104 to the stem 50 of the corresponding actuator 46. This coupling can be accomplished by any conventional means, such as threading each member 102 onto the corresponding stem 50. Each connecting member 102 is coupled, at an opposite end 106, to valve block 20. In the embodiment shown in FIGS. 1-9, this coupling is accomplished by a pin 108 that protrudes from valve block 20 and passes through an aperture formed in the end 106 of connecting member 102. However, in other embodiments, the connecting members 102 may be otherwise coupled to the valve block 20, for instance, as subsequently discussed in greater detail in conjunction with FIGS. 10 and 11.

Each of the actuators 46 act together so that they are extended or retracted at the same time. This causes the lateral ends of valve block 20 to slide substantially uniformly relative to the valve body 16, as may be appreciated based on the spatial relationship of connecting members 102 relative to valve block 20.

Valve 12 further includes first 110 and second 112 end blocks that are integral with the valve body 16. End block 110 terminates in a mount flange 114 and, similarly, end block 112 terminates in a mount flange 116. Body 44 of actuator assembly 14 is secured to end blocks 110 and 112 by conventional means, such as bolts 118 that pass through apertures 120 formed in flange 114 and similar apertures formed in flange 116, into the body 44 of actuator assembly 14. Accordingly, body 44 of actuator assembly 14 does not move relative to valve 12.

Figure 5:
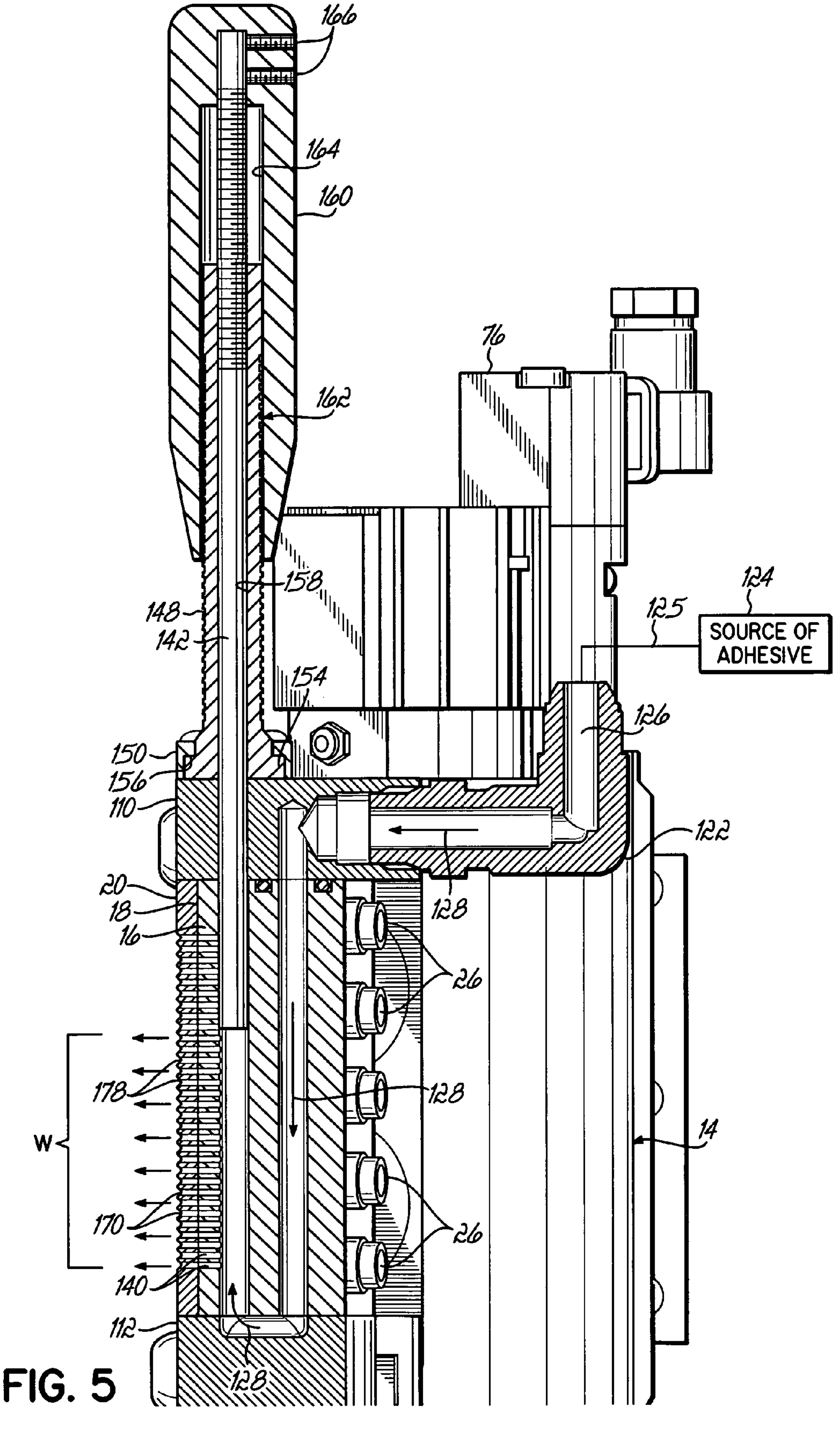
FIG. 5 is a cross-sectional view taken along the lines 5-5 in FIG. 1.
Figure 6:
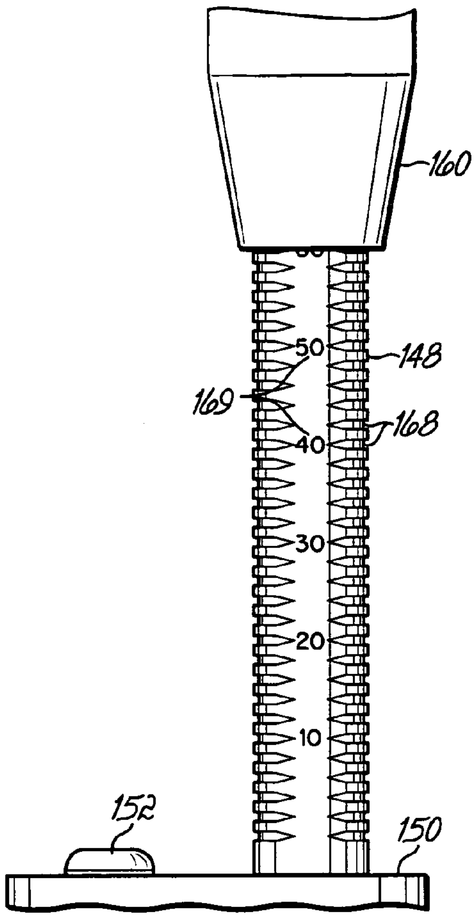
FIG. 6 is an enlarged, fragmentary view further illustrating the graduated cylinder shown in FIG. 1.

Referring now to FIG. 5, valve 12 includes an inlet port 122 that is adapted at one end to be secured to the end block 110 and is adapted at the other end to receive pressurized, heated adhesive from a source 124 of the adhesive and conduit 125 interconnecting the source 124 and inlet port 122. A supply passage 126 passes through the inlet port 122, as shown in FIG. 5, through a portion of end block 110 and then extends through valve body 16 in a first direction, through a portion of end block 112 and through another portion of valve body 16 in a second direction, with this flowpath indicated by flow arrows 128. In other embodiments, the adhesive may take a different path through valve 12.

Dispenser 10 includes a heating element 130 (FIGS. 4A and 4B) that extends partially through valve body 16 for the purpose of heating valve body 16 and the adhesive within valve body 16. Dispenser 10 also includes a temperature-sensing device 132, that also extends into the valve body 16, for the purpose of measuring the temperature of valve body 16, which also provides an indirect indication of the temperature of the adhesive within valve body 16. Electricity is supplied to the heating element 130 via connector 134 and cable 136, while the output of the temperature-sensing device 132 is routed to a suitable readout (not shown) via cable 138 and connector 134.

The heated adhesive discharges from the supply passage 126 into a first plurality of distribution passages 140 formed in valve body 16. A first end 141 (FIGS. 4A and 4B) of the passages 140 open onto the supply passage 126 and a second end 143 (FIGS. 4A and 4B) of the distribution passages 140 open onto the surface 18 of the valve body 16. At least some of the distribution passages 140 are in fluid communication with the supply passage 126, with the number of passages 140 in fluid communication with passage 126 being determined by a position of a dosing rod 142 disposed at least partially within the supply passage 126. This, in turn, determines a width W (FIG. 5) of the adhesive pattern dispensed onto a work piece such as a surface 144 of board 146.

A graduated cylinder 148 is secured to the valve body 16 and extends away from valve body 16. In the illustrative embodiment, the valve 12 includes a mount block 150 that is secured to end block 110 by conventional means such as bolts 152. Also in the illustrative embodiment, the cylinder 148 has an annular flange 154 that is captured in a recess 156 formed in the mount block 150. The graduated cylinder further includes an internal bore 158 that is substantially aligned with a portion of the supply passage 126, as illustrated in FIG. 5.

A handle 160 is threaded onto the graduated cylinder 148 by internal threads formed in the handle and mating external threads formed on an exterior surface of the graduated cylinder, as indicated collectively at 162. As shown in FIG. 5, the dosing rod 142 extends beyond the end of cylinder 148 that is opposite flange 154, and extends through an internal cavity 164 defined by handle 160. One end of the dosing rod 142 is secured within handle 160 by conventional means, such as set screws 166. Accordingly, as handle 160 is rotated, such that it moves relative to the graduated cylinder 148, the dosing rod 142 also rotates with handle 160 and translates within the supply passage 126 to vary the width W of adhesive dispensed by dispenser 10. As may be appreciated with reference to FIG. 5, as the dosing rod 142 translates within supply passage 126, more or less of the distribution passages 140, via proximal ends 141, are in fluid communication with the supply passage 126.

The graduated cylinder 148 includes a plurality of longitudinally spaced grooves 168 that are operatively effective for providing an indication of the width W of the adhesive being dispensed. The graduated cylinder 148 can optionally further include a plurality of indicia 169 on an outer surface of the cylinder 148, with each of the indicia being aligned with one of the grooves 168. In the illustrative embodiment, each of the indicia 169 are Arabic numerals that can correspond to the width W of adhesive being dispensed, as measured in millimeters, for instance.

Figure 8A:
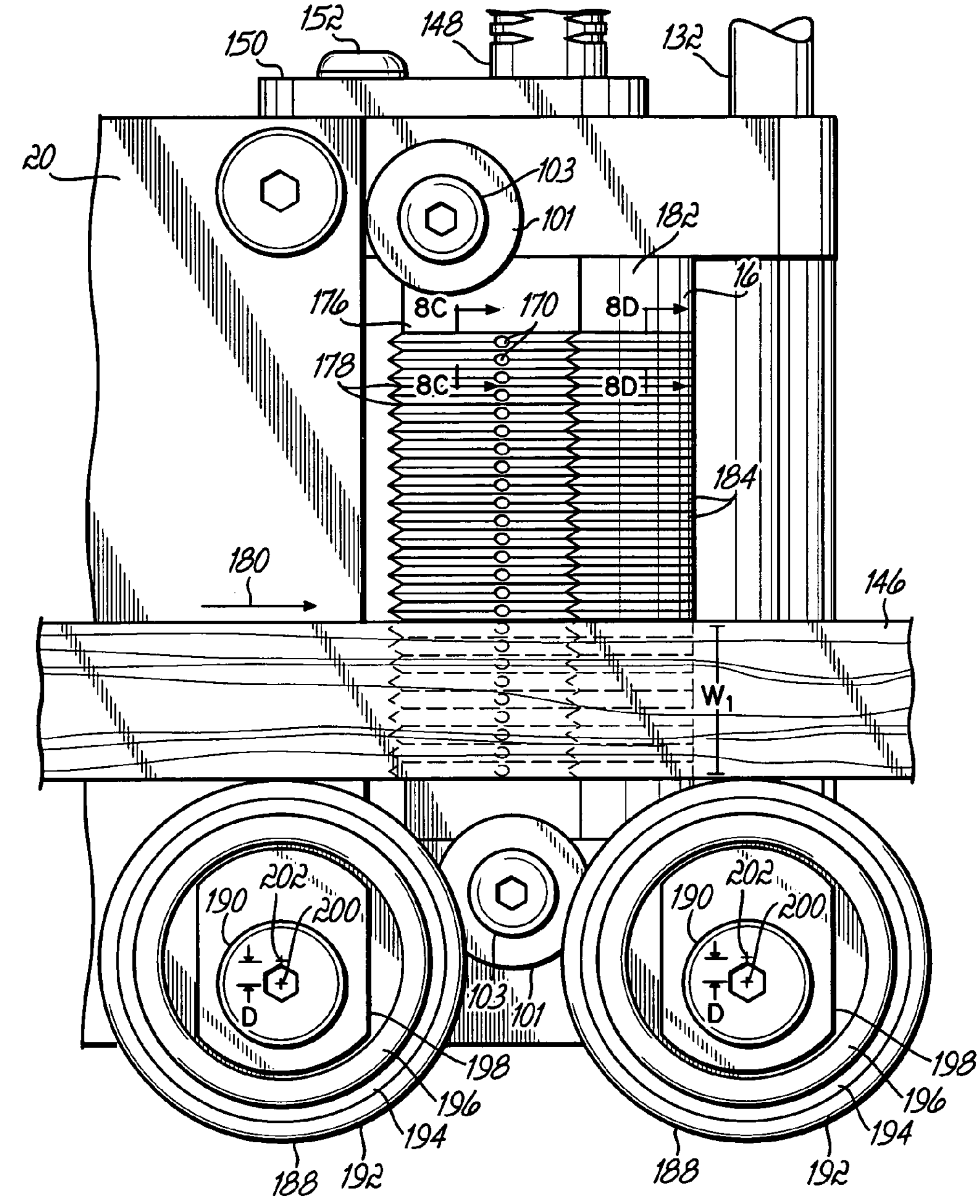
FIG. 8A is a fragmentary, enlarged, front elevation view illustrating a portion of the dispenser shown in FIG. 1, with rollers and a work piece added, and the rollers spaced apart from grooves formed in the dispenser by a first distance.
Figure 8C:
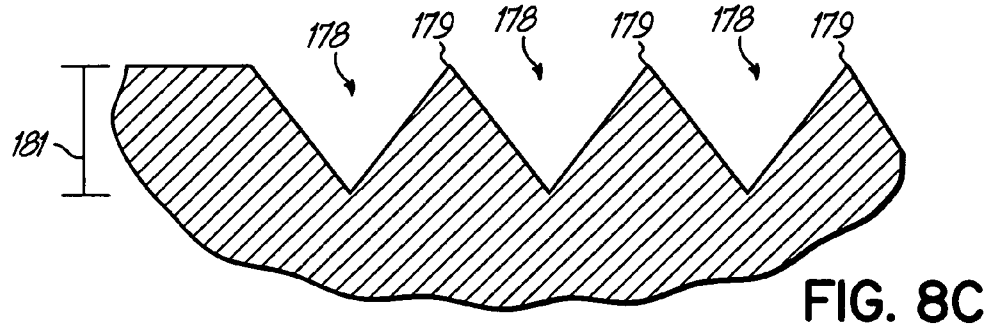
FIG. 8C is a fragmentary cross-sectional view further illustrating the grooves formed in the valve block shown in FIGS. 8A and 8B.
Figure 8B:
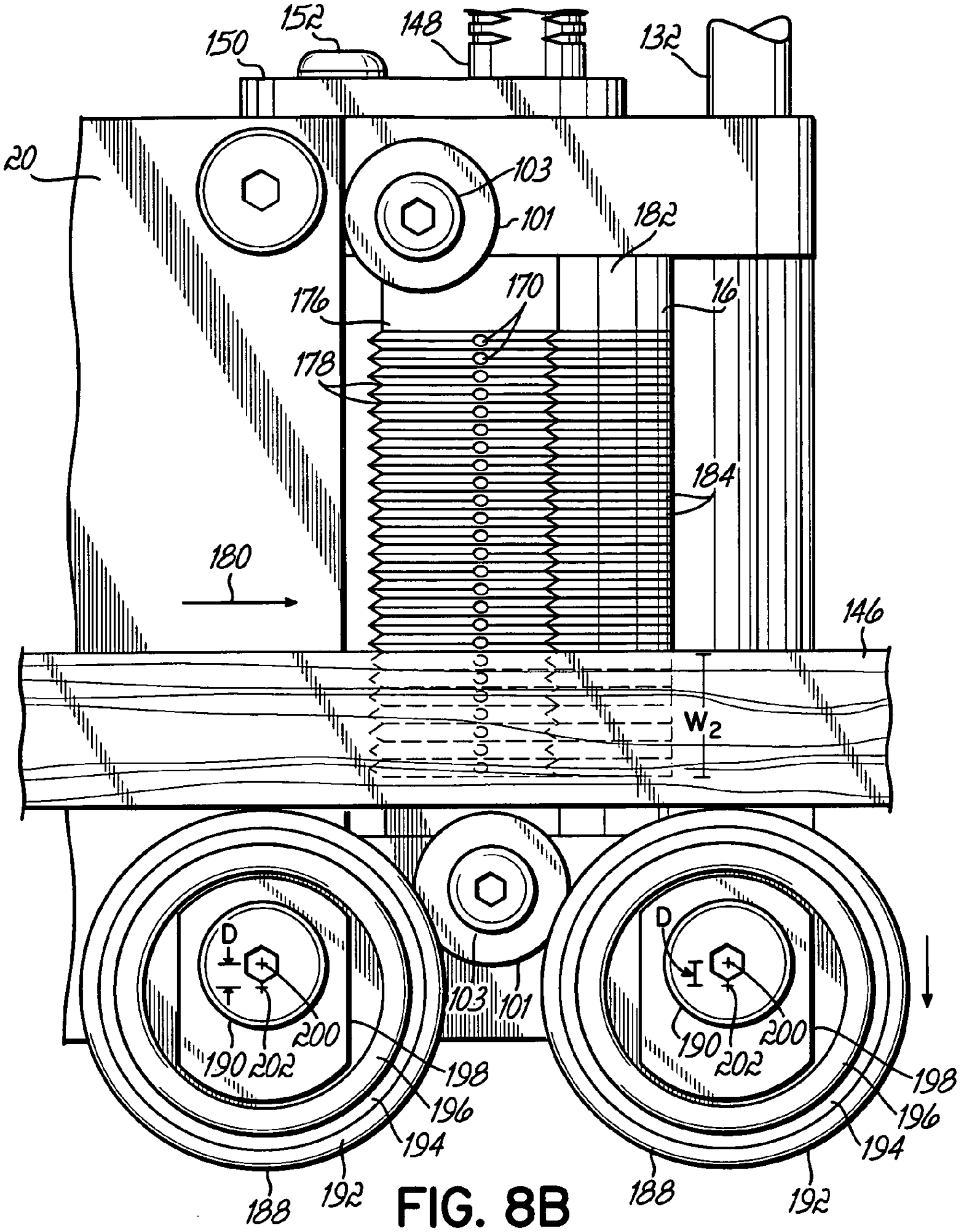
FIG. 8B is a fragmentary, enlarged, front elevation view similar to FIG. 8A, but with the rollers spaced apart from the grooves by a second distance.

A second plurality of distribution passages 170 are formed in valve block 20 and extend therethrough, as illustrated in FIG. 5. Each of the passages 170 have a first, proximal end 172 (FIGS. 4A and 4B) opening toward the valve body 16, and a second, distal end 174 (FIGS. 4A and 4B) adapted to dispense the heated adhesive onto a substrate, such as surface 144 of work piece 146, which can be a piece of wood, for instance. When each of the actuators 46 is in the extended position, the valve block 20 is in an open position and the first end 172 of each passage 170 is aligned with the distal end 143 of one of the passages 140. The second end 174 of each distribution passage 170 opens onto an outer surface 176 of valve block 20 (FIGS. 8A and 8B). A plurality of grooves 178 is formed in the outer surface 176 of valve block 20 and extend substantially in a direction corresponding to a direction 180 of movement of the work piece 146. The second ends 174 of the distribution passages 170 are in fluid communication with the grooves 178.

Figure 8D:
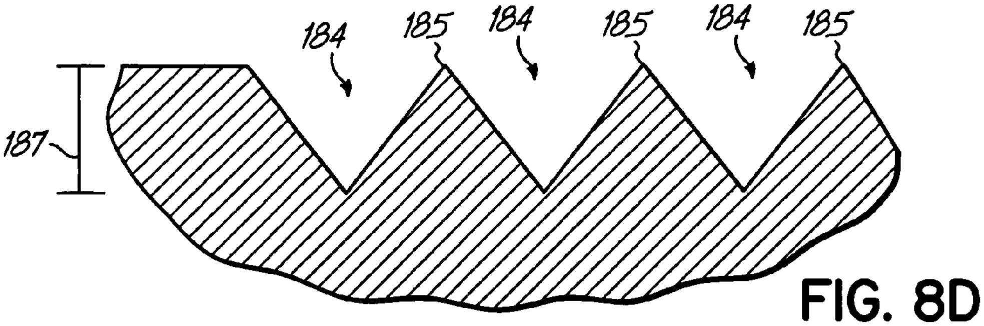
FIG. 8D is a fragmentary cross-sectional view further illustrating the grooves formed in the valve body shown in FIGS. 8A and 8B.
Figure 9:
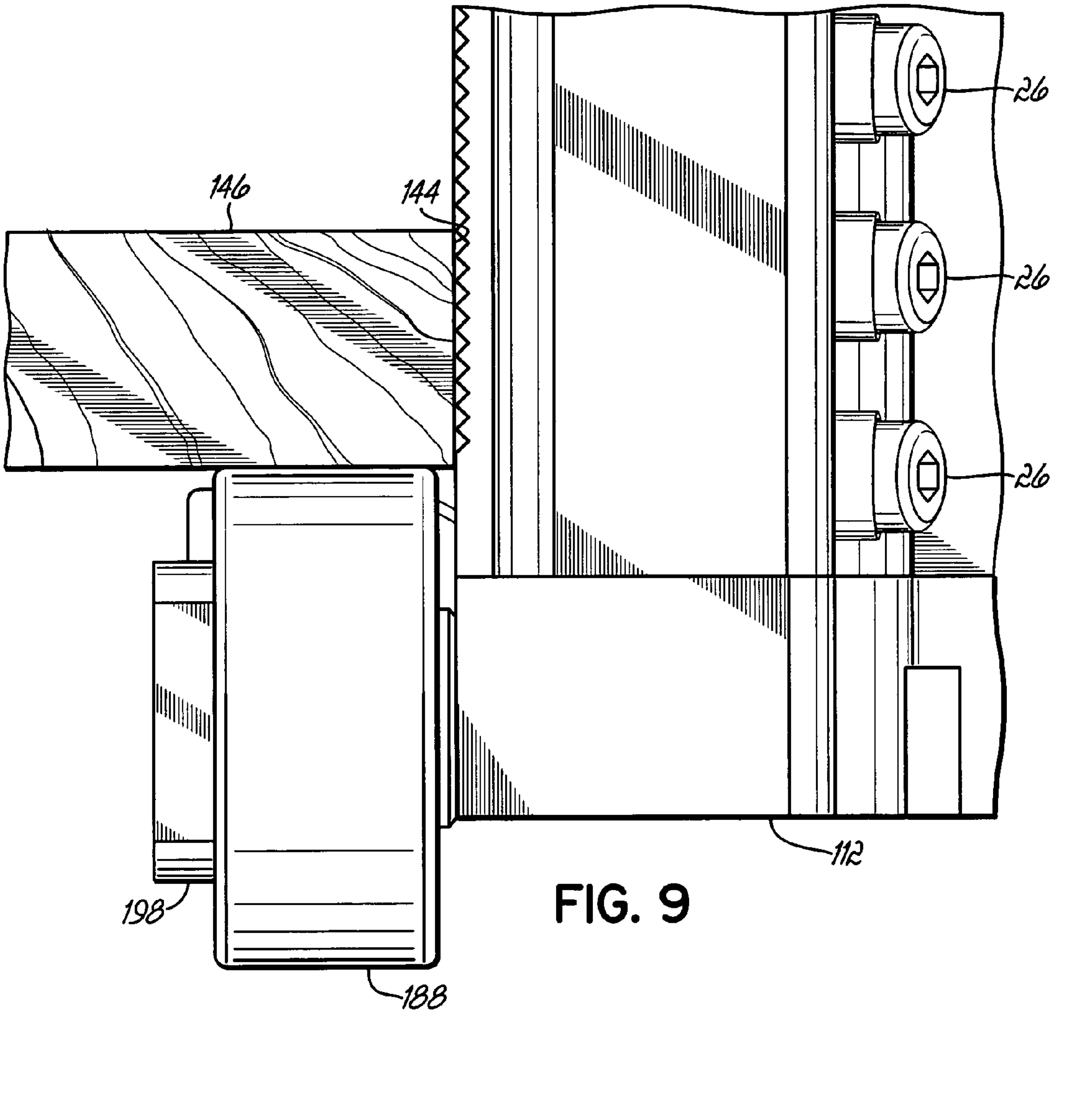
FIG. 9 is a fragmentary, enlarged, side elevation view further illustrating the dispenser and work piece shown in FIG. 8.

The valve body 16 further includes an outer surface 182 and a plurality of grooves 184 formed therein, with the grooves 184 extending substantially in a direction corresponding to the direction of movement 180 of the work piece 146. In the illustrative embodiment, the grooves 178 and the grooves 184 have substantially V-shaped cross-sections as shown in FIGS. 8C and 8D, respectively. However, grooves 178 and 184 can have other shapes within the scope of the present invention.

Figure 7:
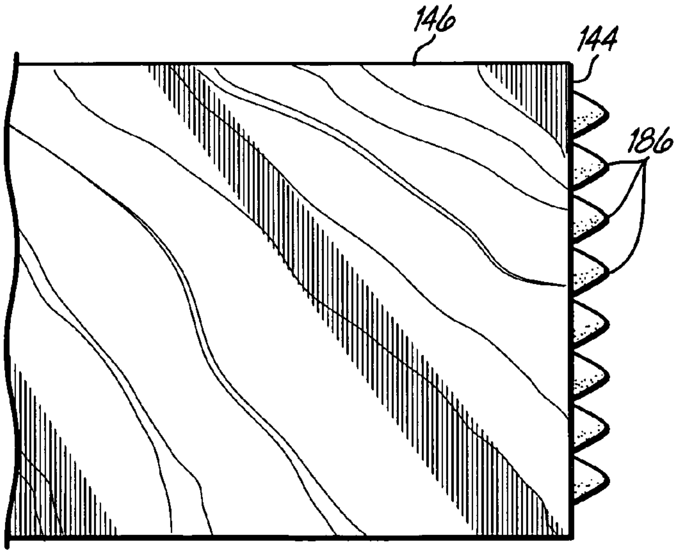
FIG. 7 is a side elevation view illustrating a plurality of beads of adhesive disposed on a surface of a work piece.

When the valve block 20 is in an open position, the heated adhesive flows through the supply passage 126 and then through those passages of the first distribution passages 140 that are not blocked by dosing rod 142. The adhesive then flows through aligned ones of the distribution passages 170, opening onto the grooves 178 formed in the valve block 20. The adhesive is dispensed via grooves 178 and 184 onto the surface 144 of the work piece 146 in beads 186 that can initially have a substantially triangular shape, as shown in FIG. 7. The outermost ridges 179 of grooves 178 and the outermost ridges 185 of grooves 184 are preferably in substantially firm contacting engagement with surface 144 of work piece 146 during application of adhesive onto surface 144 to ensure the desired control of the pattern of applied adhesive. As shown in FIG. 8C, each groove 178 has a depth 181 and, as shown in FIG. 8D, each groove 184 has a depth 187. The magnitude of depth 181 of grooves 178 and the magnitude of depth 187 of grooves 184 are predetermined to control the volume of adhesive applied for a particular application, i.e., for a particular range of adhesive viscosity and a particular range of substrate density. Accordingly, the predetermined magnitudes of depths 181 and 187 of grooves 178 and 184, respectively, also control the ultimate film thickness of adhesive for a particular application, that exists between a work piece, such as work piece 146, and an edge band material (not shown) secured to the work piece with the adhesive. The magnitudes of the depths 181 of grooves 178 and depths 187 of grooves 184 can be varied, from one application to another, to compensate for different adhesive viscosities and substrate densities to adjust the volume of adhesive applied as required. This can be accomplished by having multiple matched sets of valve body 16 and valve block 20 that are uniquely identified, such as by part number, with the various sets having different magnitudes of the depth 181 of grooves 178 and depth 187 of grooves 184 for use in different applications.

When the valve block 20 is in a closed position, the distribution passages 170 in valve block 20 are not aligned with the distribution passages 140 in valve body 16 as can be appreciated with reference to FIG. 4B. Accordingly, passages 170 are not in fluid communication with passages 140. With valve block 20 closed, adhesive from the supply passage 126 is stopped at the interface of surface 42 of valve block 20 and passages 140. This is considered the valving point. The volume of adhesive downstream of the valving point is essentially the volume of the distribution passages 170, which is relatively low. Accordingly, dispenser 10 provides a relatively clean cutoff of the adhesive.

The adhesive dispenser 10 can optionally include a plurality of rollers 188, such as the pair of rollers illustrated in FIG. 8 that are rotatably mounted to the valve 12, for purposes of guiding the work piece 146 as it moves by grooves 178 and 184 for application of the adhesive onto the surface 144 of the work piece 146. In the illustrative embodiment, the rollers 188 are rotatably mounted to the end block 112 of valve body 16 via bolts 190. Rollers 188 include an outer race 192, a ring 194 of bearings (individual bearings not shown) and an inner race 196. The outer peripheral surface of the outer race 192 contacts work piece 146 as it passes by dispenser 10 and therefore positions work piece 146 relative to grooves 178 and 184. The position of the outer race 192 relative to grooves 178 and 184, in conjunction within the position of the dosing rod 142 within supply passage 126, establishes the width W of the adhesive pattern being dispensed.

A pair of cams 198 are also secured to valve 12 by bolts 190. Bolts 190 have a center 200 as shown in FIG. 8A. Cam 198 has a bore formed therethrough, with a center 202 that is offset relative to the center 200 of bolt 190 by a distance D. This offset relationship allows the position of outer race 192 to be varied as the cam 198 is clocked or rotated about bolt 190, since the arcuate surfaces of cam 198 contact the inner race 196 of roller 188. FIG. 8A illustrates rollers 188 in a first position, which corresponds to the smallest distance from grooves 178 and 184 and results in a width $W_1$ of the pattern of adhesive being dispensed. FIG. 8B illustrates rollers 188 in a second position achieved by rotating cam 180 degrees relative to the position shown in FIG. 8A. In this position, the distance between rollers 188 and grooves 178 and 184 is the greatest and results in a width $W_2$ of the pattern of adhesive being dispensed.

Figure 10:
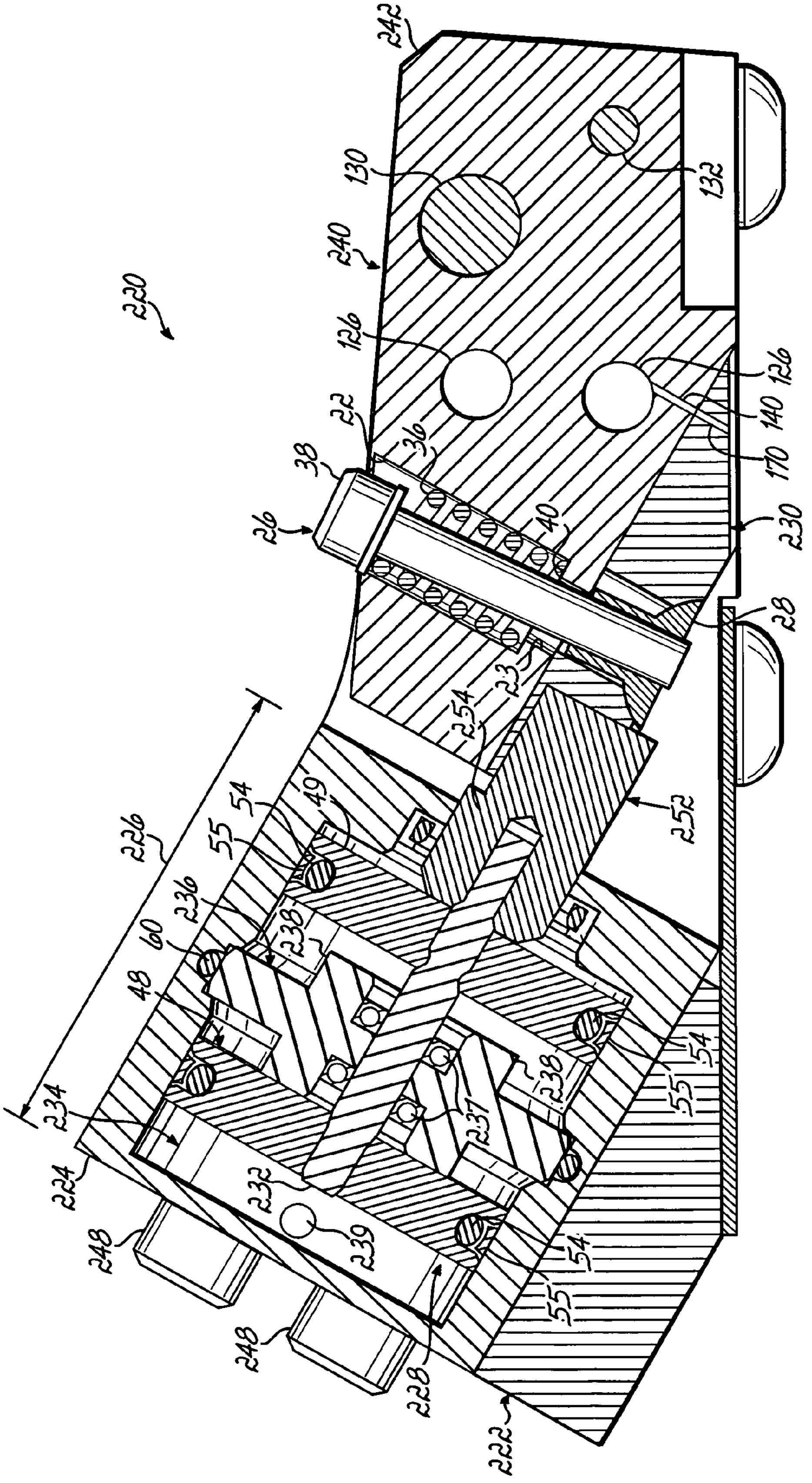
FIG. 10 is a cross-sectional view, similar to FIG. 3, but illustrating a portion of an adhesive dispenser according to a second embodiment of the present invention.
Figure 11:
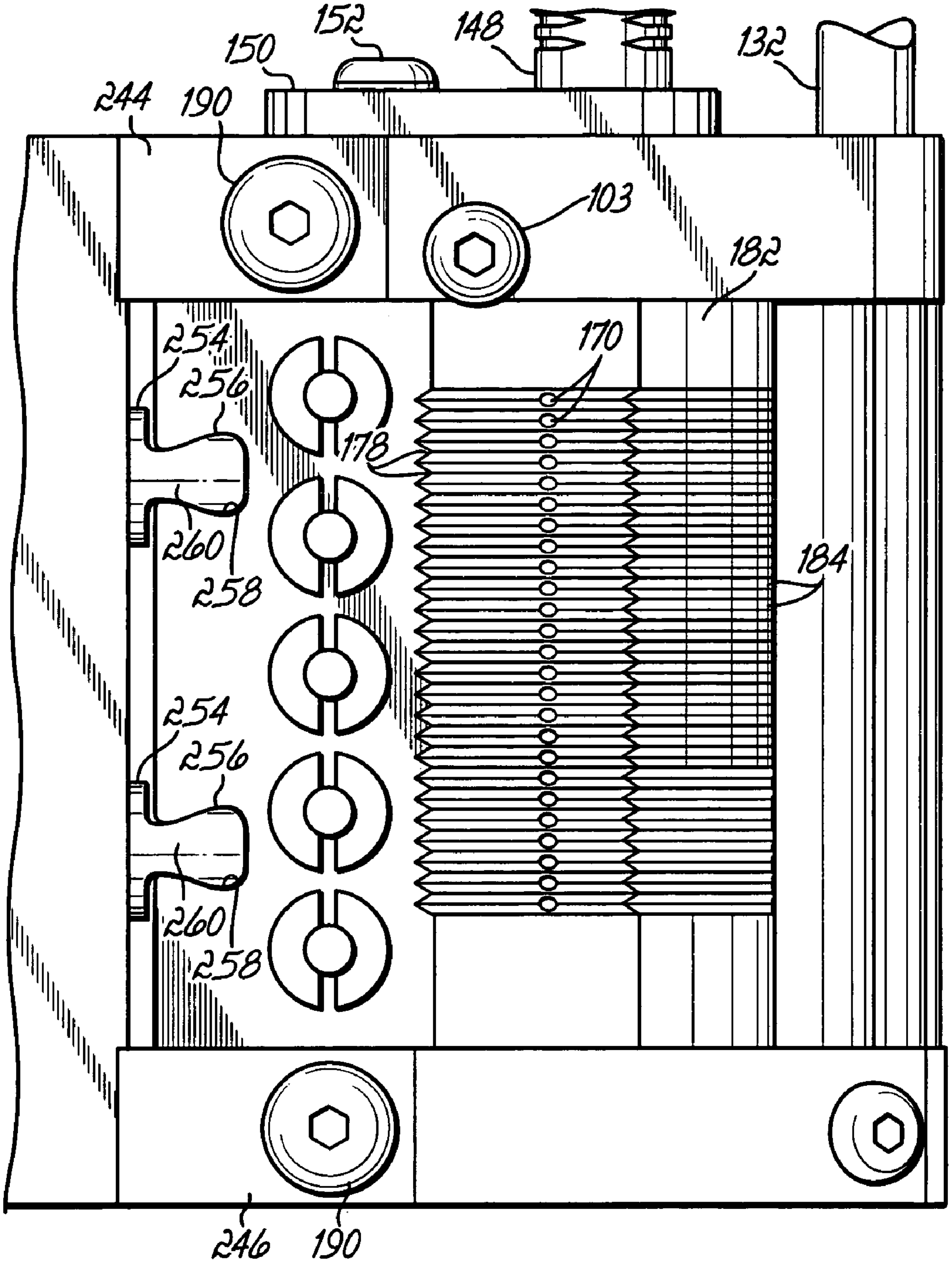
FIG. 11 is a fragmentary elevation view further illustrating the second embodiment of the present invention.

FIGS. 10 and 11 illustrate a portion of an adhesive dispenser 220 according to a second embodiment of the present invention. Dispenser 220 operates in the same manner as dispenser 10 and includes many of the same components. One area of difference is that dispenser 220 includes an actuator assembly 222 that has a body 224 with a length 226 that extends in a direction substantially parallel to the pair of included actuators 228 (one shown in FIG. 10). Length 226 is substantially less than the corresponding length of the body 44 of actuator assembly 14 for spatial considerations to accommodate a particular application. Another difference between dispenser 220 and dispenser 10 is the interconnection between actuators 228 and a valve block 230 of dispenser 220, as compared to the interconnection between actuators 46 and valve block 20 of dispenser 10.

Like actuators 46 of dispenser 10, each actuator 228 of dispenser 220 includes two pistons 48, 49. Pistons 48 and 49 are secured to a stem 232 that can be somewhat shorter, and have a somewhat different configuration than piston 50 of actuators 46. Pistons 48 and 49 are disposed in sliding, sealing engagement with an inner surface 234 of body 224 of actuator assembly 220 via seals such as O-rings 54 and glide rings 55, the same as actuators 46 of dispenser 10.

Each actuator 228 includes a stationary sealing plug 236 in lieu of the sealing plug 56 of actuators 46. A portion of sealing plug 236 is positioned in an annular recess formed in body 224, which retains plug 236 in position. Plug 236 disposed in sealing engagement with body 224 with a sealing member such as O-ring 60. Seals 237 provide a seal between stem 232 and sealing plug 236. Thesealing plug 236 further includes a pair of laterally spaced transverse members 238, with one of the members 238 disposed on either side of the piston 232.

When valve block 230 of dispenser 220 is in the open position shown in FIG. 10, such that passages 140 and 170 are aligned with one another and are in fluid communication with one another, the transverse members 238 are in contacting engagement with piston 48 which establishes the stroke of actuator 228 in the extended position. When actuator 228 is fully retracted, the transverse members 238 are in contacting engagement with piston 49, which establishes the stroke in this direction. When actuators 238 are retracted, the flow passages 140 and 170 are not aligned with one another and are therefore not in fluid communication with one another, such that valve block 230 is in a closed position. In view of the interaction between transverse members 238 and pistons 48 and 49, the stops 101 of dispenser 10 are not required in dispenser 220.

Dispenser 220 includes a valve 240 that is the same as valve 12 of dispenser 10 except as otherwise noted. Valve 240 includes a valve body 242 that has a somewhat different cross-sectional shape than valve body 16 of valve 12 as seen by a comparison of the cross-sectional views shown in FIGS. 10 and 3. However, valve body 242 is otherwise the same as valve body 16 and therefore has the same adhesive flow passages that includes supply passage 126, distribution passages 140 and grooves 184.

Valve 240 includes end blocks 244 and 246 that are integral with valve body 242, in lieu of end blocks 110 and 112 of valve 12. The body 224 of actuator assembly 222 is secured to end blocks 244 and 246 by conventional means such as bolts 248 that pass through body 224 from a side opposite valve body 242 and into end blocks 244 and 246. Accordingly, body 224 of actuator assembly 222 does not move relative to valve 240. In view of the foregoing positioning of bolts 248, the flanges 114 and 116, and the associated apertures 120, of valve 12 are not needed which results in a more compact assembly and can result in reduced manufacturing costs.

Valve block 230 of valve 240 is the same as valve block 20 of valve 10 except as subsequently discussed. Valve block 230 is connected to actuators 228 by a pair of connecting members 252 which are used instead of the connecting members 102 of dispenser 10. Each connecting member 252 includes a stub shaft 254 that is threaded onto the stem 232 of one of the actuators 228, and an interlocking portion 256 that is integral with the stub shaft 254 and protrudes therefrom and is connected to valve block 230. The interlocking portions 256 have a generally bulbous shape, as shown in FIG. 11, and are received by apertures 258 having a complementary shape that are formed in valve block 230. Due to the reduced size neck 260 of interlocking portions 256, the interlocking portions 256 can not be dislodged from apertures 258 by forces acting in the directions of actuation (extension and retraction) of actuators 228.

Actuators 228 are actuated in the same manner as actuators 46, with pressurized air being supplied to cavities within body 224 via passages that include passage 239, to exert a force on one side of piston 48 and the corresponding side of piston 49, with the cavities adjacent the opposite sides of pistons 48 and 49 being vented to atmosphere, to move stems 232, connecting members 252 and valve block 250 in the desired direction. The flow of adhesive through dispenser 220, with valve block 250 in the open position, is the same as discussed previously with respect to dispenser 10 when valve block 20 is in the open position.

While the foregoing description has set forth the preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. An adhesive dispenser for dispensing adhesive onto a substrate, the dispenser comprising:

a valve body having an adhesive supply passage;

a first plurality of distribution passages formed in said valve body, at least some of said first plurality of distribution passages communicating with said supply passage at first ends thereof, each of said first plurality of distribution passages opening onto a first surface of said valve body at second ends thereof;

a valve block mounted for sliding movement along said first surface of said valve body by a plurality of fasteners extending through said valve block and said valve body, said valve block including a second plurality of distribution passages, said second plurality of distribution passages having first ends opening toward said valve body and second ends adapted to dispense the adhesive onto the substrate; and an actuator assembly operative to move the valve block between a closed position and an open position, the open position being a position in which the first ends of the second plurality of distribution passages are aligned with, and are in fluid communication with, the second ends of the first plurality of distribution passages, and the closed position being a position in which the first ends of the second plurality of the distribution passages are not aligned with, and are not in fluid communication with, the second ends of the first plurality of distribution passages.

2. An adhesive dispenser as recited in claim 1, wherein said actuator assembly comprises:

at least one actuator;

a body, said at least one actuator being disposed within said body; and at least one connecting member, said at least one connecting member being coupled to said at least one actuator and said valve block.

3. An adhesive dispenser as recited in claim 2, wherein each said actuator comprises:

at least one piston and a stem; and said at least one connecting member being coupled at one end thereof to said stem and coupled at the other end thereof to said valve block.

4. An adhesive dispenser as recited in claim 2, further comprising:

a pair of end blocks integral with said valve body;

wherein said body of said actuator assembly is secured to said end blocks.

5. An adhesive dispenser as recited in claim 2, wherein:

said at least one actuator comprises a pair of pistons spaced apart from one another and a stem, said stem being coupled to each of said pistons.

6. An adhesive dispenser as recited in claim 5, wherein each said actuator further comprises:

a stationary piston separator assembly disposed intermediate said two pistons and disposed in sealing engagement with an internal surface of said body of said actuator assembly.

7. An adhesive dispenser as recited in claim 1, wherein said valve block further comprises an outer surface with grooves extending substantially in a direction corresponding to a direction of movement of the substrate, and said second ends of said second plurality of distribution passages communicate with said grooves to discharge adhesive into said grooves and onto the substrate.

8. An adhesive dispenser as recited in claim 7, wherein:

said valve body includes an outer surface with grooves extending substantially in a direction corresponding to a direction of movement of the substrate;

said grooves of said valve body are aligned with said grooves of said valve block when said valve block is in an open position, said grooves of said valve body being misaligned with said grooves of said valve block when said valve block is in a closed position.

9. An adhesive dispenser for dispensing adhesive onto a substrate, the dispenser comprising:

a valve body having an adhesive supply passage and a first surface defining an exterior of said valve body;

a first plurality of distribution passages formed in said valve body, at least some of said first plurality of distribution passages communicating with said supply passage at first ends thereof, each of said first plurality of distribution passages opening onto said first surface of said valve body at second ends thereof;

a valve block mounted for sliding movement along the first surface of said valve body, said valve block including a second plurality of distribution passages, said second plurality of distribution passages having first ends opening toward said valve body and second ends adapted to dispense the adhesive onto the substrate;

an actuator assembly operative to move the valve block between a closed position and an open position, the open position being a position in which the first ends of the second plurality of distribution passages are aligned with, and are in fluid communication with, the second ends of the first plurality of distribution passages, and the closed position being a position in which the first ends of the second plurality of the distribution passages are not aligned with, and are not in fluid communication with, the second ends of the first plurality of distribution passages; and a dosing rod disposed at least partially within said adhesive supply passage;

wherein said dosing rod is translatable within said supply passage and the number of said first plurality of distribution passages that communicate with said supply passage is determined by the position of said dosing rod within said supply passage.

10. An adhesive dispenser as recited in claim 9, further comprising:

a graduated cylinder secured to said valve body; wherein said cylinder includes an internal bore that is substantially aligned with at least a portion of said supply passage;

said cylinder further includes a plurality of external, longitudinally spaced grooves that are operatively effective for providing an indication of a width of the adhesive being dispensed.

11. An adhesive dispenser as recited in claim 10, further comprising:

a handle threaded onto said graduated cylinder; wherein one end of said dosing rod is secured to said handle, said dosing rod being rotatable with said handle.

12. An adhesive dispenser as recited in claim 10, wherein:

said graduated cylinder further includes a plurality of indicia on an outer surface of said cylinder, each of said indicia being aligned with one of said grooves of said cylinder.

13. An adhesive dispenser as recited in claim 10, wherein:

said dosing rod extends through said internal bore of said graduated cylinder and into said adhesive supply passage.

14. An adhesive dispenser for dispensing adhesive onto a substrate, the dispenser comprising:

a valve body having an adhesive supply passage and a first surface defining an exterior of said valve body;

a first plurality of distribution passages formed in said valve body, at least some of said first plurality of distribution passages communicating with said supply passage at first ends thereof, each of said first plurality of distribution passages opening onto said first surface of said valve body at second ends thereof;

a valve block mounted for sliding movement along said first surface of said valve body, said valve block including a second plurality of distribution passages, said second plurality of distribution passages having first ends opening toward said valve body and second ends adapted to dispense the adhesive onto the substrate;

an actuator assembly operative to move the valve block between a closed position and an open position, the open position being a position in which the first ends of the second plurality of distribution passages are aligned with, and are in fluid communication with, the second ends of the first plurality of distribution passages, and the closed position being a position in which the first ends of the second plurality of the distribution passages are not aligned with, and are not in fluid communication with, the second ends of the first plurality of distribution passages; and a plurality of rollers rotatably mounted on said valve body, said rollers being operatively effective for guiding the substrate as it moves relative to said dispenser.

15. An adhesive dispenser as recited in claim 14, further comprising:

a plurality of cams mounted on said body, each of said cams being associated with one of said rollers.

16. An adhesive dispenser as recited in claim 15, further comprising:

a plurality of bolts used to mount said rollers and said cams to said valve body, said cams being rotatable about said bolts and offset relative to said bolts thereby allowing a position of said rollers to be adjusted.

* * * * *